(12) United States Patent
Porat et al.

(10) Patent No.: US 12,471,128 B2
(45) Date of Patent: *Nov. 11, 2025

(54) SIGNALING AND DECODING OF PUNCTURED SUBBANDS IN TRIGGER-BASED PPDU

(71) Applicant: Avago Technologies International Sales Pte. Limited, Singapore (SG)

(72) Inventors: Ron Porat, San Diego, CA (US); Karim Nassiri Toussi, San Mateo, CA (US); Srinath Puducheri Sundaravaradhan, Sunnyvale, CA (US); Sundaram Vanka, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,588

(22) Filed: Sep. 6, 2023

(65) Prior Publication Data

US 2023/0413310 A1 Dec. 21, 2023

Related U.S. Application Data

(63) Continuation of application No. 17/170,139, filed on Feb. 8, 2021, now Pat. No. 11,792,834.

(Continued)

(51) Int. Cl.
*H04W 72/541* (2023.01)
*H04W 72/542* (2023.01)
*H04W 72/0453* (2023.01)

(52) U.S. Cl.
CPC ....... *H04W 72/541* (2023.01); *H04W 72/542* (2023.01); *H04W 72/0453* (2013.01)

(58) Field of Classification Search
CPC ............ H04W 72/02; H04W 72/0453; H04W 72/082; H04W 72/085; H04W 72/541; H04W 72/542; H04W 76/10
See application file for complete search history.

(56) References Cited

U.S. PATENT DOCUMENTS 10,201,009 B1  2/2019  Wang et al.
11,290,223 B1  3/2022  Zhang et al.
(Continued)

OTHER PUBLICATIONS

Final Office Action on U.S. Appl. No. 17/170,139 DTD Dec. 9, 2022.
(Continued)

*Primary Examiner* — Michael Thier
*Assistant Examiner* — Prince A Mensah
(74) *Attorney, Agent, or Firm* — Foley & Lardner LLP

(57) ABSTRACT

In some aspects, the disclosure is directed to methods and systems for signaling and decoding of punctured sub-bands in a trigger-based PPDU. In one aspect, at least one of the communication interface or the processing circuitry of a wireless communication device is configured to generate a trigger frame that includes signaling indicating that at least one other wireless communication device is allowed to reduce a bandwidth of an allocated resource unit (RU) for transmitting data via a communication channel; transmit, via the communication channel, the trigger frame to at least one other wireless communication device; receive, via the communication channel and from the at least one other wireless communication device, an uplink (UL) orthogonal frequency division multiple access (OFDMA) frame including the data; and process the UL OFDMA frame including the data based on the signaling.

15 Claims, 13 Drawing Sheets

Related U.S. Application Data

(60) Provisional application No. 62/984,204, filed on Mar. 2, 2020.

(56) References Cited

U.S. PATENT DOCUMENTS

| | | |
|---|---|---|
| 2010/0039992 A1 | 2/2010 | Prakash et al. |
| 2011/0032986 A1* | 2/2011 | Banger .............. H04N 21/2402 375/240.07 |
| 2015/0201419 A1* | 7/2015 | Zhou ........................ H04L 1/00 370/329 |
| 2016/0087775 A1 | 3/2016 | Hedayat |
| 2016/0315681 A1* | 10/2016 | Moon ................ H04W 74/0816 |
| 2017/0041106 A1* | 2/2017 | Srivastava ............ H04L 5/0064 |
| 2017/0230292 A1 | 8/2017 | Lau |
| 2018/0198496 A1* | 7/2018 | Seok .................... H04B 7/0452 |
| 2018/0220422 A1* | 8/2018 | Bhattad ................ H04L 5/0064 |
| 2019/0349930 A1* | 11/2019 | Chu ...................... H04W 28/20 |
| 2021/0007014 A1 | 1/2021 | Desai et al. |
| 2021/0045151 A1 | 2/2021 | Chen et al. |
| 2021/0083943 A1 | 3/2021 | Chen et al. |
| 2021/0099740 A1 | 4/2021 | Hale et al. |

OTHER PUBLICATIONS

Non-Final Office Action on U.S. Appl. No. 17/170,139 DTD Jun. 10, 2022.
Notice of Allowance on U.S. Appl. No. 17/170,139 DTD Jun. 7, 2023.

\* cited by examiner

| RU BW | BR bits | BW Reduction Amount |
|---|---|---|
| (0MHz, 80MHz] | 00 | None |
| (0MHz, 80MHz] | 01 | 20MHz |
| (0MHz, 80MHz] | 10 | 40MHz |
| (80MHz, 160MHz] | 00 | None |
| (80MHz, 160MHz] | 01 | 20MHz |
| (80MHz, 160MHz] | 10 | 40MHz |
| (80MHz, 160MHz] | 11 | 80MHz |
| (160MHz, 320MHz] | 00 | None |
| (160MHz, 320MHz] | 01 | 40MHz |
| (160MHz, 320MHz] | 10 | 80MHz |
| (160MHz, 320MHz] | 11 | 160MHz |

FIG. 5B

RU BW = (0MHz, 80MHz)

| BR bits | BRS bits | BW Reduction Segment |
|---|---|---|
| 01 | 00x | 20LL |
| 01 | 01x | 20LU |
| 01 | 10x | 20UL |
| 01 | 11x | 20UU |
| 10 | 000 | 40L |
| 10 | 001 | 40U |
| 10 | 010 | 20LL+20UL |
| 10 | 011 | 20LU+20UL |
| 10 | 100 | 20LL+20UU |
| 10 | 101 | 20LU+20UU |
| 10 | 110 | reserved |
| 10 | 111 | reserved |

RU BW = (80MHz, 160MHz]

500C

| BR bits | BRS bits | BW Reduction Segment |
|---|---|---|
| 01 | 000 | 20LLL |
| 01 | 001 | 20LLU |
| 01 | 010 | 20LUL |
| 01 | 011 | 20LUU |
| 01 | 100 | 20ULL |
| 01 | 101 | 20ULU |
| 01 | 110 | 20UUL |
| 01 | 111 | 20UUU |
| 10 | 000 | 40LL |
| 10 | 001 | 40LU |
| 10 | 010 | 40UL |
| 10 | 011 | 40UU |
| 10 | 100 | 20LLU+20LUL |
| 10 | 101 | 20LUU+20ULL |
| 10 | 110 | 20ULU+20UUL |
| 10 | 111 | 20UUU+20LLL |
| 11 | 000 | 80L |
| 11 | 001 | 80U |
| 11 | 010 | 40LU+40UL |
| 11 | 011 | 40UU+40LL |
| 11 | 100 | 40LL+40UL |
| 11 | 101 | 40LU+40UU |
| 11 | 110 | reserved |
| 11 | 111 | reserved |

FIG. 5D

RU BW = (160MHz, 320MHz]

| BR bits | BRS bits | BW Reduction Segment |
|---|---|---|
| 01 | 000 | 40LLL |
| 01 | 001 | 40LLU |
| 01 | 010 | 40LUL |
| 01 | 011 | 40LUU |
| 01 | 100 | 40ULL |
| 01 | 101 | 40ULU |
| 01 | 110 | 40UUL |
| 01 | 111 | 40UUU |
| 10 | 000 | 80LL |
| 10 | 001 | 80LU |
| 10 | 010 | 80UL |
| 10 | 011 | 80UU |
| 10 | 100 | 40LLU+40LUL |
| 10 | 101 | 40LUU+40ULL |
| 10 | 110 | 40ULU+40UUL |
| 10 | 111 | 40UUU+40LLL |
| 11 | 000 | 160L |
| 11 | 001 | 160U |
| 11 | 010 | 80LU+80UL |
| 11 | 011 | 80UU+80LL |
| 11 | 100 | 80LL+80UL |
| 11 | 101 | 80LU+80UU |
| 11 | 110 | reserved |
| 11 | 111 | reserved |

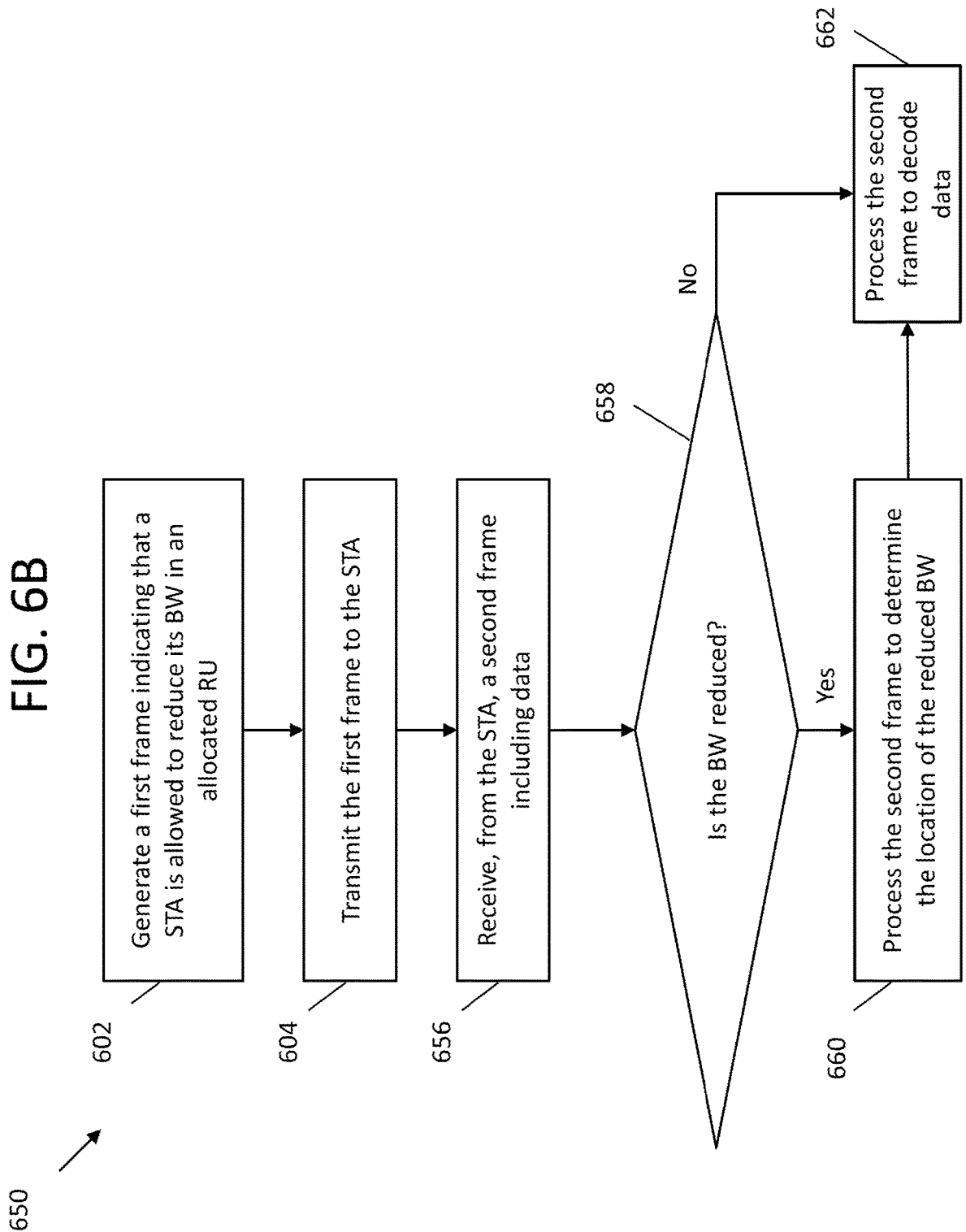

SIGNALING AND DECODING OF PUNCTURED SUBBANDS IN TRIGGER-BASED PPDU

CROSS-REFERENCE TO RELATED PATENT APPLICATIONS

This application claims the benefit of priority to U.S. application Ser. No. 17/170,139, filed Feb. 8, 2021, which claims the benefit of priority to U.S. Provisional Patent Application No. 62/984,204, filed Mar. 2, 2020, each of which is incorporated by reference in its entirety for all purposes.

FIELD OF THE DISCLOSURE

This disclosure generally relates to systems and methods for communication systems. In particular, this disclosure relates to systems and methods for signaling and communications within single user, multiple user, multiple access, and/or multiple-input-multiple-output (MIMO) wireless communications.

BACKGROUND OF THE DISCLOSURE

The Wi-Fi Standard 802.11be will support punctured 80 MHz, 160 MHz and 320 MHz transmissions. Unlike previous 802.11 generations, a station (STA) that intends to transmit at a given bandwidth, e.g., 160 MHz, and finds parts of that spectrum busy or disallowed can transmit on available portions, e.g., 80+40 MHz, and signal the exact transmission bandwidth (BW) and location in the signaling (SIG) field. However, SIG field-based signaling may be unavailable or not possible in some implementations, preventing STAs from taking advantage of punctured transmissions.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 5A is a diagram illustrating an example communication protocol indicating a BW reduction amount.

FIG. 5B is a diagram illustrating an example communication protocol indicating which one or more segments have their BW reduced for the case when the allocated RU is less than or equal to 80 MHz.

FIG. 5C is a diagram illustrating an example communication protocol indicating which one or more segments have their BW reduced for the case when the allocated RU is less than or equal to 160 MHz and greater than 80 MHz.

FIG. 5D is a diagram illustrating an example communication protocol indicating which one or more segments have their BW reduced for the case when the allocated RU is less than or equal to 320 MHz and greater than 160 MHz.

FIG. 6B is a diagram illustrating an embodiment of a method for execution by one or more wireless communication devices.

Figure 1:
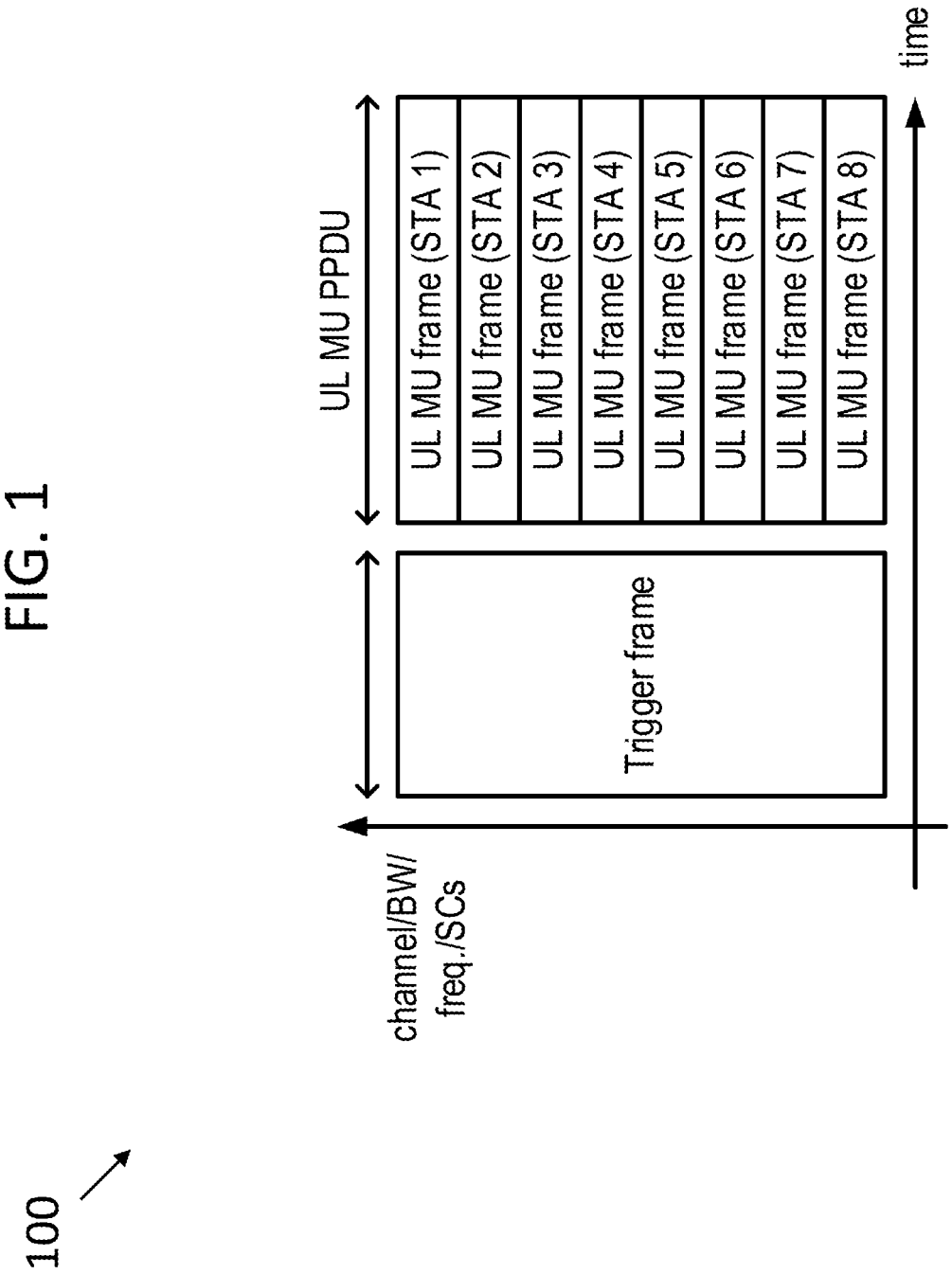
FIG. 1 is a diagram illustrating an example of a trigger-based signal exchange between wireless communication devices.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for signaling and decoding punctured sidebands in a trigger-based PPDU; and Section B describes a network environment and computing environment which may be useful for practicing embodiments described herein.

A. Signaling and Decoding Punctured Sidebands in a Trigger-Based PPDU

The Wi-Fi Standard 802.11be may support punctured 80 MHz, 160 MHz and 320 MHz transmissions. Unlike previous 802.11 generations, a station (STA) that intends to transmit, e.g., 160 MHz, and finds parts of that spectrum busy or disallowed can transmit on portions, e.g., 80+40 MHz, and signal a transmission bandwidth (BW) and a location in a signaling (SIG) field. However, in a trigger based uplink (UL) orthogonal frequency division multiple access (OFDMA) transmission, the STA may not be able to signal the BW and the location in the SIG field as the access point (AP) may determine the contents of the SIG field and instruct the STA the BW and the location in which to transmit the UL OFDMA data frame. It is, however, desirable to enable STA sending a trigger-based UL OFDMA data frame to reduce its BW if some parts of its allocated BW are busy.

Some embodiments of the present disclosure enable blind detection by the AP in trigger based UL OFDMA. In some embodiments, the AP decodes the UL OFDMA data frame to determine if its BW has been reduced. In some embodiments, new fields are included in the trigger frame that set rules for how the STA can reduce its BW. Accordingly, the new fields may help the AP control its decoding complexity by reducing the number of hypotheses the AP has to check to determine if a STA reduced its BW in transmitting the trigger based UL OFDMA data frame. Some embodiments of the present disclosure enable a STA to signal if the STA transmitted on a partial (e.g., smaller than allocated by the AP) BW. In some embodiments, new bits are included in signaling fields (e.g., U-SIG) in the UL OFDMA data frame.

Various embodiments disclosed herein are directed to a wireless communication device. In some embodiments, the wireless communication device includes a communication interface and processing circuitry that is coupled to the communication interface. In some embodiments, at least one of the communication interface or the processing circuitry is configured to generate a trigger frame that includes signaling indicating that at least one other wireless communication device is allowed to reduce a bandwidth of an allocated resource unit (RU) for transmitting data via a communication channel; transmit, via the communication channel, the trigger frame to at least one other wireless communication device; receive, via the communication channel and from the at least one other wireless communication device, an uplink (UL) orthogonal frequency division multiple access (OFDMA) frame including the data; and process the UL OFDMA frame including the data based on the signaling.

In some embodiments, the wireless communication device processes the UL OFDMA frame including the data without receiving, from the at least one other wireless communication device, signaling indicating an amount for reduction of the bandwidth. In some embodiments, the UL OFDMA frame indicates whether the wireless communication device is reducing the bandwidth. In some embodiments, the at least one other wireless communication device reduces the bandwidth based on determining that an amount of the bandwidth of the allocated RU includes interference greater than a predetermined threshold. In some embodiments, the trigger frame indicates one or more sub-band locations in which the bandwidth is allowed to be reduced. In some embodiments, the trigger frame indicates a resolution with which the at least one other wireless communication device is allowed to reduce the bandwidth. In some embodiments, the trigger frame indicates a target received signal strength indicator (RSSI) based on the resolution. In some embodiments, at least one of the communication interface or the processing circuitry is further configured to receive, via the first communication channel and from a second other wireless communication device, a second uplink (UL) OFDMA frame including second data and process the second UL OFDMA frame including the second data based on the signaling. In some embodiments, the wireless communication device is an access point (AP) and the at least one other communication device is a station (STA).

Various embodiments disclosed herein are directed to a wireless communication device. In some embodiments, the wireless communication device includes a communication interface and processing circuitry that is coupled to the communication interface. In some embodiments, at least one of the communication interface or the processing circuitry configured to generate, in response to a trigger frame from a second wireless communication device allocating a resource unit (RU) having a first bandwidth, an uplink (UL) orthogonal frequency division multiple access (OFDMA) frame including data and transmit, to the second wireless communication device, the UL OFDMA frame in a second bandwidth of the RU. In some embodiments, the second bandwidth is less than the first bandwidth by an amount determined by the wireless communication device. In some embodiments, the UL OFDMA frame is to be processed to decode the data.

In some embodiments, the method further includes determining whether a third bandwidth of the allocated RU includes interference greater than a predetermined threshold. In some embodiments, transmitting the UL OFDMA frame in the second bandwidth based on determining that the amount of the first bandwidth of the allocated RU includes the interference greater than the predetermined threshold. In some embodiments, the UL OFDMA frame does not include signaling that indicates that the wireless communication device is reducing the first bandwidth to the second bandwidth. In some embodiments, the UL OFDMA frame includes signaling that indicates that the wireless communication device is reducing the first bandwidth to the second bandwidth. In some embodiments, the UL OFDMA frame indicates a resolution with which the wireless communication device reduces the bandwidth. In some embodiments, the UL OFDMA frame indicates one or more sub-band locations in which the bandwidth is reduced by the amount. In some embodiments, the UL OFDMA frame indicates a different packet extension identifier than a packet extension identifier indicated in the trigger frame. In some embodiments, the UL OFDMA frame indicates a different pre-forward error correcting (FEC) padding factor than an FEC padding factor indicated in the trigger frame. In some embodiments, the wireless communication device is a station (STA) and the second wireless communication device is an access point (AP).

Various embodiments disclosed herein are directed to a method by a wireless communication device. In some embodiments, the method includes generating, by processing circuitry of the wireless communication device, a trigger frame that includes signaling indicating that at least one other wireless communication device is allowed to reduce a bandwidth of an allocated resource unit (RU) for transmitting data via a communication channel; transmitting, by a communication interface of the wireless communication device and via the communication channel, the trigger frame to at least one other wireless communication device; receiving, by the communication interface and via the communication channel and from the at least one other wireless communication device, an uplink (UL) orthogonal frequency division multiple access (OFDMA) frame including the data; and processing, by the processing circuitry, the UL OFDMA frame including the data based on the signaling.

FIG. 1 is a diagram illustrating an example 100 of a trigger-based signal exchange between wireless communication devices. A central controller (e.g., an AP, a central controller wireless device) is configured to generate a trigger frame (or other broadcasted frame), e.g., which may be an orthogonal frequency-division multiple access (OFDMA) frame, that specifies certain information. In some examples, the trigger frame specifies (e.g., specifies, indicates, allocates) a plurality of resource units (RUs) to be used by respective wireless devices (e.g., STAs) when transmitting a second OFDMA frame to the wireless communication device.

The central controller may be configured to transmit the trigger frame to the wireless devices. One or more of the wireless devices may prepare data for transmission to the central controller after parsing the resource allocation information conveyed in the trigger frame and discovering a resource allocation allocated to itself. The wireless devices may transmit uplink (UL) data frames to the central controller at the respective RUs indicated in the trigger frame.

In some embodiments, the UL data frames are at least one of single-user (SU) UL data frames and multi-user (MU) UL data frames.

Figure 2:
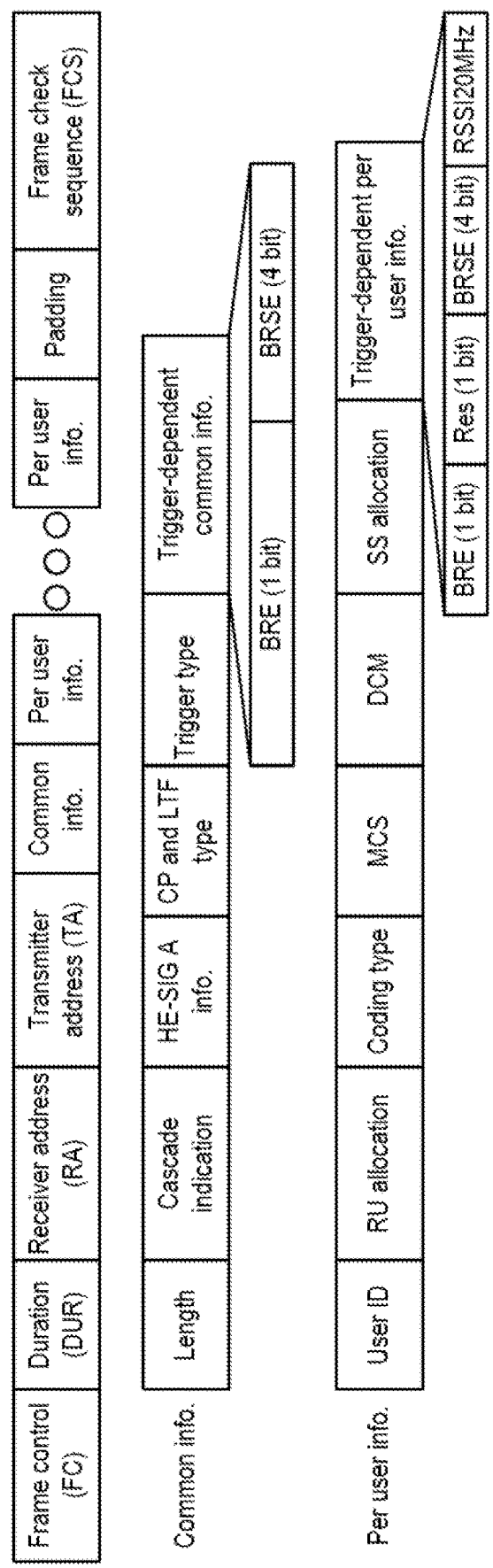
FIG. 2 is a diagram illustrating an example of a trigger frame for use in a trigger-based signal exchange between wireless communication devices.

FIG. 2 is a diagram illustrating an example 200 of a trigger frame for use in a trigger-based signal exchange between wireless communication devices. In some embodiments, the Common information (info.) field of the trigger frame includes one or more of the following: a (e.g., 1 bit) BW Reduction Enable (BRE) field and/or a (e.g., 4 bit) BW Reduction Segment Enable (BRSE) field. The BRE may enable the AP to control whether BW reduction is permitted (e.g., allowed) at all on the subsequent trigger-based (TB) physical layer convergence protocol (PLCP) protocol data unit (PPDU). Setting to "disallowed" may indicate that no STA can reduce its BW. The BRSE field may be an n-bit mask to indicate which segments (e.g., sub-bands, portions of RUs, 80 MHz segments) the STAs are allowed to reduce their BW if allocated in multiple segments (e.g., which segments are not used for transmitting the UL OFDMA data frame, which segments are punctured). Alternatively, the BRSE field may indicate which segments are transmitting the UL OFDMA data, such that the segments not indicated are the ones reducing their BW.

In some embodiments, the Per user info. field of the trigger frame includes one or more of the following: a (e.g., 1 bit) per-user BRE field, a (e.g., 4 bit) per-user BRSE field, a (e.g., 1 bit) resolution (Res) field, or a per-20 MHz RSSI (RSSI20 MHz) field. The per-user BRE field may enable the AP to control which STA can reduce their BW. The per-user BRSE field may indicate in which segments the STA is allowed to reduce its BW if it is allocated in multiple segments. The resolution field can indicate a resolution of the reduced BW. For example, the resolution field uses a 1 bit to signal 20 MHz or 40 MHz. For example, if the STA was allocated 80 MHz and the Resolution field signals 20 MHz, then the STA can reduce its BW to 20 MHz, 40 MHz, or 60 MHz in any location within its allotted 80 MHz, and if the Resolution field signals 40 MHz then the STA can reduce its BW to 40 MHz in any location within its allotted 80 MHz. The BRE, BRSE and resolution fields can reduce hypotheses checking by AP. The RSSI20 MHz field can signal the UL target RSSI per 20 MHz. The RSSI20 MHz field may be used because if the STA reduces its transmit BW, then the same target RSSI at the AP translates to a higher power-spectral density (PSD), which can impede the AP's reception of other STAs' signals.

Figure 3:
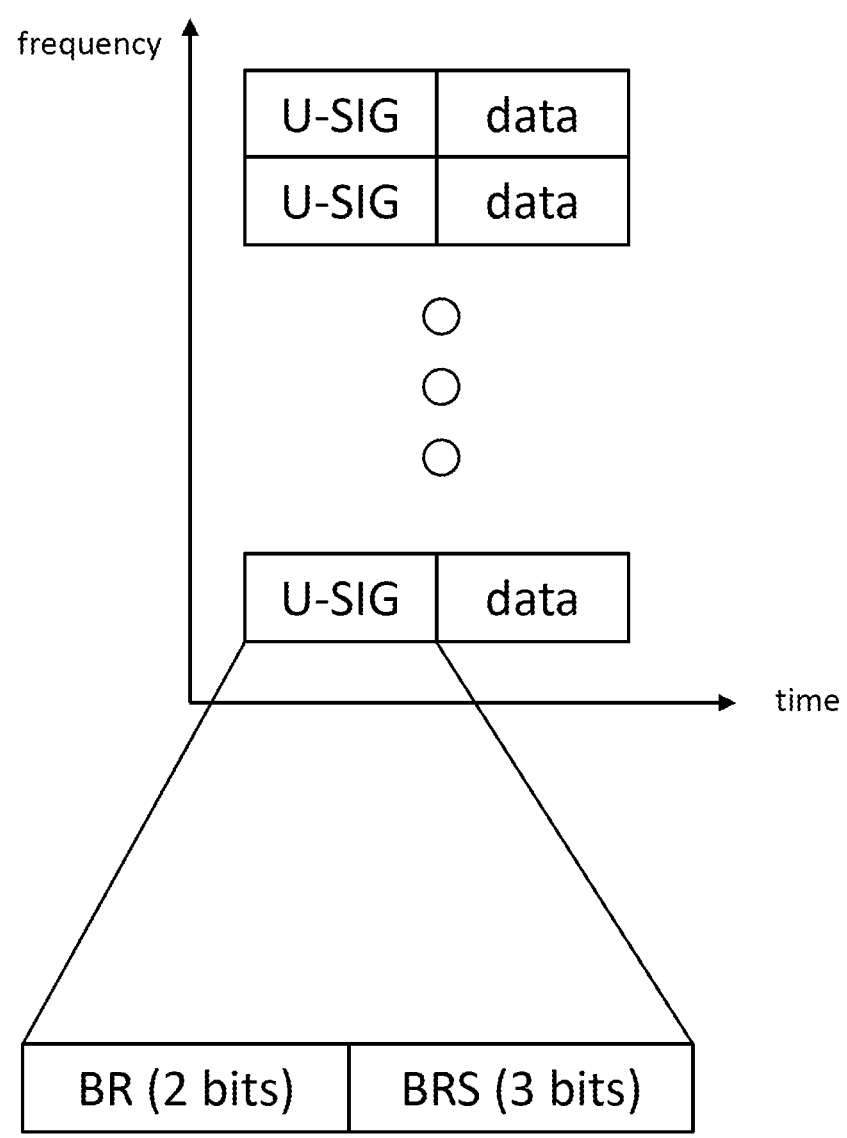
FIG. 3 is a diagram illustrating an example of a UL data frame for use in a trigger-based signal exchange between wireless communication devices.

FIG. 3 is a diagram illustrating an example of a UL frame (e.g., UL data frame, UL OFDMA frame) 300 for use in a trigger-based signal exchange between wireless communication devices. In some embodiments, the UL frame includes multiple 20 MHz portions. Each 20 MHz portion includes a data field and a signaling (SIG) field (e.g., a universally signaling (U-SIG) field or a SIG-A field). In some embodiments, each 20 MHz portion is transmitted by a different STA to the AP. In some embodiments, at least two 20 MHz portions are transmitted by a same STA to the AP.

In some embodiments, each STA determines a BW reduction amount (e.g., a resolution) and a location (e.g., a sub-band) of the BW reduced segments. In some embodiments, each STA maps the BW reduction amount and the location of the BW reduced segments to bits in the U-SIG field of the UL OFDMA frame to be transmitted. In other words, the bit-mapping in the U-SIG may be performed per each STA that is transmitting the UL OFDMA frame. The U-SIG field signals (e.g., indicates) if a STA transmits on a partial BW, smaller than allocated by the AP. In some embodiments, the U-SIG includes a (e.g., 2 bit) BW reduction (BR) field. In some embodiments, the BR field indicates an amount of BW that the corresponding STA is reduced by.

In some embodiments, the U-SIG includes a (e.g., 3 bit) BW Reduction Segment (BRS) field. In some embodiments, the BRS field indicates which one or more segments have their BW reduced.

Figure 4:
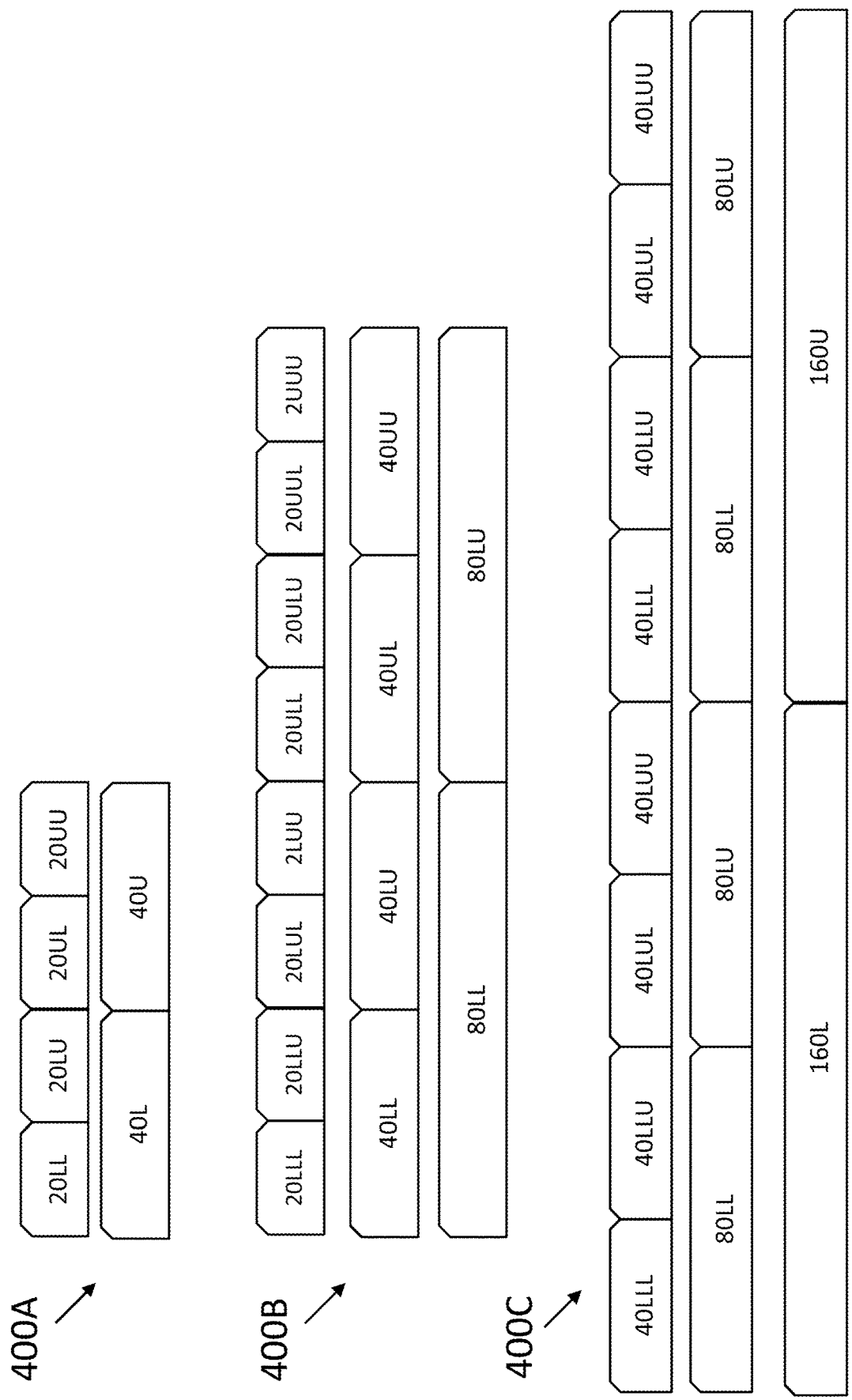
FIG. 4 is a diagram illustrating examples of 80 MHz RU segments, 160 MHz RU segments, and 320 MHz RU segments.

Referring now to FIG. 4, illustrated is a diagram of example 400A of 80 MHz RU segments, example 400B of 160 MHz RU segments, and example 400C of 320 MHz RU segments. The first variable (e.g., L or U) indicates a lower-half (or higher-half) of the RU, and the second variable indicates a lower-half (or higher-half) of the segment identified by the first. For example, the first 20 MHz segment of the 80 MHz RU of 400A can be referred to as "20LL," the first 20 MHz segment of the 80 MHz RU of 400A can be referred to as "20LU," the third 20 MHz segment of the 80 MHz RU of 400A can be referred to as "20UL," the fourth 20 MHz segment of the 80 MHz RU of 400A can be referred to as "20UU,"

Referring to FIG. 5A, illustrated is a diagram of an example communication protocol 500A for the BR field indicating a BW reduction amount. The example protocol 500A maps a RU BW and the BR bits to a BW reduction amount. For example, if the allocated RU (e.g., the BW) is 80 MHz or less and (a) the BR bits are '00,' then the BW of the allocated RU is not reduced, (b) the BR bits are '01,' then the BW of the allocated RU is reduced by 20 MHz, or (c) the BR bits are '10,' then the BW of the allocated RU may be reduced by 40 MHz.

If the allocated RU exceeds 80 MHz, the allocated RU does not exceed 160 MHz, and (a) the BR bits are '00,' then the BW of the allocated RU may not reduced (b) the BR bits are '01,' then the BW of the allocated RU may be reduced by 20 MHz, (c) the BR bits are '10,' then the BW of the allocated RU may be reduced by 40 MHz, or (d) the BR bits are '11,' then the BW of the allocated RU may be reduced by 80 MHz. If the allocated RU exceeds 160 MHz, the allocated RU does not exceed 320 MHz, and (a) the BR bits are '00,' then the BW of the allocated RU may not reduced (b) the BR bits are '01,' then the BW of the allocated RU may be reduced by 40 MHz, (c) the BR bits are '10,' then the BW of the allocated RU may be reduced by 80 MHz, or (d) the BR bits are '11,' then the BW of the allocated RU may be reduced by 160 MHz. In other implementations, various other encodings of BW reduction to BR bits may be utilized.

FIG. 5B is a diagram illustrating example protocol 500B indicating which one or more segments have their BW reduced for the case when the allocated RU is less than or equal to 80 MHz. The example protocol 500B maps the BR bits and the BRS bits to a BW reduction segment. For example, if the BR bits are '01' (e.g., indicating that the BW reduction amount is 20 MHz) and (a) the BRS bits are '00x,' then the segment in which the BW is reduced is 20LL, (b) the BRS bits are '01x,' then the segment in which BW is reduced is 20LU, (c) the BRS bits are '10x,' then the segment in which the BW is reduced is 20UL, or (d) the BRS bits are '11x,' then the segment in which BW is reduced is 20UU.

If the BR bits are '10' and (a) the BRS bits are '000,' then the segment in which BW is reduced is 40L, or (b) the BRS bits are '001,' then the segment in which BW is reduced is 40U. In some embodiments, the segments in which the BW is reduced are not contiguous. For example, if the BR bits are '10' and (a) the BRS bits are '010,' then the segments in which BW is reduced are 20LU+20UL, (a) the BRS bits are '011,' then the segments in which BW is reduced are 20UU+20LL, (a) the BRS bits are '101,' then the segments in which BW is reduced are 20LL+20UL, (a) the BRS bits are '111,' then the segments in which BW is reduced are 20LU+20UU. In other implementations, various other encodings of BW reduction to BR bits may be utilized.

FIG. 5C is a diagram illustrating example protocol 500C indicating which one or more segments have their BW reduced for the case when the allocated RU is less than or equal to 160 MHz and greater than 80 MHz. For example, if the BR bits are '01' and (a) the BRS bits are '000,' then the segment in which BW is reduced is 20LLL, (b) the BRS bits are '001,' then the segment in which BW is reduced is 20LLU, (c) the BRS bits are '010' then the segment in which BW is reduced is 20LUL, (d) the BRS bits are '011,' then the segment in which BW is reduced is 20LUU, (e) the BRS bits are '100,' then the segment in which BW is reduced is 20ULL, (f) the BRS bits are '101,' then the segment in which BW is reduced is 20ULU, (g) the BRS bits are '110,' then the segment in which BW is reduced is 20UUL, or (h) the BRS bits are '111,' then the segment in which BW is reduced is 20UUU.

If the BR bits are '10' and (a) the BRS bits are '000,' then the segment in which BW may be reduced is 40LL, (b) the BRS bits are '001,' then the segment in which BW may be reduced is 40LU, (c) the BRS bits are '010' the segment in which BW may be reduced is 40UL, (d) the BRS bits are '011,' then the segment in which BW may be reduced is 40UU, (e) the BRS bits are '100,' then the segments in which BW may be reduced are 20LLU+20LUL, (f) the BRS bits are '101,' then the segments in which BW may be reduced are 20LUU+20ULL, (g) the BRS bits are '110,' then the segments in which BW may be reduced are 20ULU+20UUL, or (h) the BRS bits are '111,' then the segments in which BW may be reduced are 20UUU+20LLL.

If the BR bits are '11' and (a) the BRS bits are '000,' then the segment in which BW may be reduced is 80L, (b) the BRS bits are '001,' then the segment in which BW may be reduced is 80U, (c) the BRS bits are '010,' then the segments in which BW may be reduced are 40LU+40UL, (d) the BRS bits are '011,' then the segments in which BW may be reduced are 40UU+40LL, (e) the BRS bits are '100,' then the segments in which BW may be reduced are 40LL+40UL, or (f) the BRS bits are '101,' then the segments in which BW may be reduced are 40LU+40UU. In other implementations, various other encodings of BW reduction to BR bits may be utilized.

FIG. 5D is a diagram illustrating example protocol 500D indicating which one or more segments have their BW reduced for the case when the allocated RU is less than or equal to 320 MHz and greater than 160 MHz. For example, if the BR bits are '01' and (a) the BRS bits are '000,' then the segment in which BW is reduced is 40LLL, (b) the BRS bits are '001,' then the segment in which BW is reduced is 40LLU, (c) the BRS bits are '010' then the segment in which BW is reduced is 40LUL, (d) the BRS bits are '011,' then the segment in which BW is reduced is 40LUU, (e) the BRS bits are '100,' then the segment in which BW is reduced is 40ULL, (f) the BRS bits are '101,' then the segment in which BW is reduced is 40ULU, (g) the BRS bits are '110,' then the segment in which BW is reduced is 40UUL, or (h) the BRS bits are '111,' then the segment in which BW is reduced is 40UUU.

If the BR bits are '10' and (a) the BRS bits are '000,' then the segment in which BW may be reduced is 80LL, (b) the BRS bits are '001,' then the segment in which BW may be reduced is 80LU, (c) the BRS bits are '010' the segment in which BW may be reduced is 80UL, (d) the BRS bits are '011,' then the segment in which BW may be reduced is 80UU, (e) the BRS bits are '100,' then the segments in which BW may be reduced are 40LLU+40LUL, (f) the BRS bits are '101,' then the segments in which BW may be reduced are 40LUU+40ULL, (g) the BRS bits are '110,' then the segments in which BW may be reduced are 40ULU+40UUL, or (h) the BRS bits are '111,' then the segments in which BW may be reduced are 40UUU+40LLL.

If the BR bits are '11' and (a) the BRS bits are '000,' then the segment in which BW may be reduced is 160L, (b) the BRS bits are '001,' then the segment in which BW may be reduced is 160U, (c) the BRS bits are '010,' then the segments in which BW may be reduced are 80LU+80UL, (d) the BRS bits are '011,' then the segments in which BW may be reduced are 80UU+80LL, (e) the BRS bits are '100,' then the segments in which BW may be reduced are 80LL+80UL, or (f) the BRS bits are '101,' then the segments in which BW may be reduced are 80LU+80UU. In other implementations, various other encodings of BW reduction to BR bits may be utilized.

The triggered STA may signal information to the AP to indicate one or more updated PPDU parameters in the trigger based (TB) PPDU. In some embodiments, a signaling bit is used to signal a different packet extension disambiguity (e.g., identifier) in the PPDU than what was indicated in the trigger message. In some embodiments, a signaling bit signals a different pre-FEC padding factor than what was indicated in the trigger message. A signaling bit may signal if the PPDU encoding process with low-density parity-check (LDPC) with the reduced BW resulted has an extra OFDM symbol. Signaling bits may signal if the modulation and coding scheme used in the TB PPDU. Signaling bits may signal if dual carrier modulation (DCM) is employed in the TB PPDU. A signaling bit may signal if the forward error correcting (FEC) type has changed. Signaling bits may be used to signal the starting spatial stream and the number of spatial streams. The TB PPDU parameters may be modified and signaled regardless of bandwidth reduction. In some embodiments, the signaling bits are included in the U-SIG.

Figure 6A:
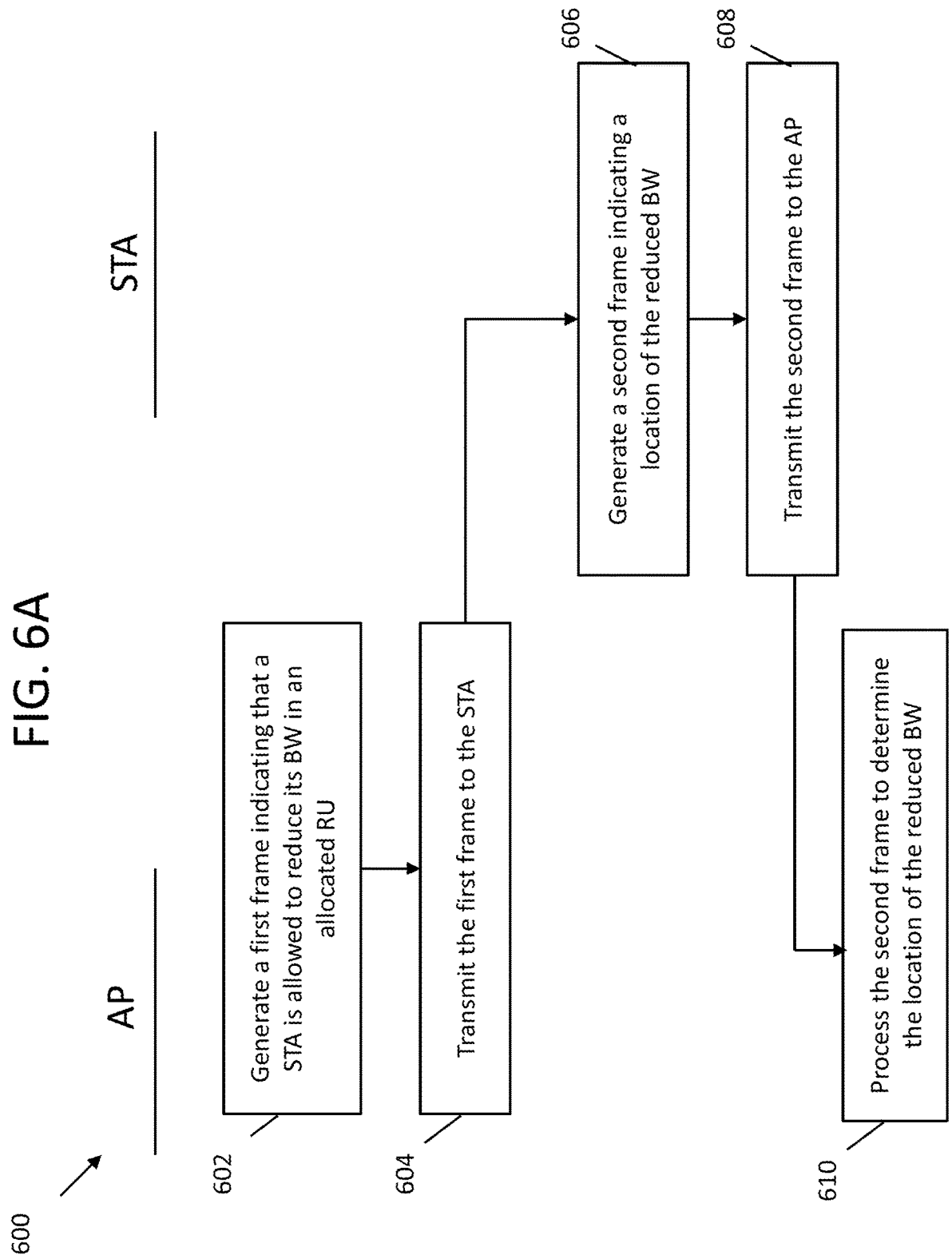
FIG. 6A is a diagram illustrating an embodiment of a method for execution by one or more wireless communication devices.

FIG. 6A is a diagram illustrating an embodiment of a method 600 for execution by one or more wireless communication devices. Additional, fewer, or different operations may be performed in the method 600 depending on the embodiment.

At operation 602, a first wireless communication device (e.g., an AP) may generate a first frame that indicates that at least one other wireless communication device (e.g., a STA) is allowed to reduce bandwidth in an allocated resource unit (RU) for transmitting data in a second frame via a communication channel (e.g., by an amount determined by the at least one other wireless communication device). In some embodiments, the first wireless communication device indicates an allowed resolution and allowed locations of the reduced bandwidth (e.g., segments/sub-bands in the allocated RU that are not used for transmitting the second frame, segments/sub-bands that are punctured). The first frame can be a orthogonal frequency division multiple access (OFDMA) frame. In some embodiments, the first frame is a trigger frame.

At operation 604, the first wireless communication device may transmit the first frame. The first frame can be transmitted via the communication channel. The first frame is transmitted to the at least one other wireless communication device to be processed by the at least one other wireless communication device to determine whether to reduce the bandwidth in the allocated RU. In some embodiments, the first frame is broadcasted to multiple wireless communication devices.

At operation 606, the at least one other wireless communication device may generate the second frame that indicates one or more of whether the other wireless communication device is reducing its BW for transmitting the data, an amount by which the other wireless communication device is reducing its BW, or a location of the reduced bandwidth within the allocated RU. The second frame can be an orthogonal frequency division multiple access (OFDMA) frame. In some embodiments, the second frame is an uplink (UL) frame (e.g., a UL OFDMA frame) that includes the data to be transmitted.

At operation 608, the other wireless communication device transmits the second frame. In some embodiments, the second frame is transmitted in the allocated RU having the reduced BW. Thus, for example, if the other wireless communication device indicates that the location of the reduced BW of a 80 MHz RU is the 20LL segment, the other wireless communication device transmits the second frame in the 20LU+40U segments. In some embodiments, multiple wireless communication devices send second frames at the same time (or at approximately the same time, or, in some implementations, in series) to the first wireless communication device as part of a MU UL frame. Accordingly, operations 606-608 may be performed by a plurality of other wireless communication devices simultaneously.

At operation 610, the first wireless communication device processes the second frame to determine whether the at least one other wireless communication device is reducing its BW and the location of the reduced bandwidth within the allocated RU.

FIG. 6B is a diagram illustrating an embodiment of a method 650 for execution by one or more wireless communication devices. Additional, fewer, or different operations may be performed in the method 650 depending on the embodiment.

Operations 602 and 604 may be the same as or similar to the operations 602 and 604 of the method 600. At operation 656, the wireless device (e.g., an AP) receives, from another wireless device (e.g., a STA), a second frame including data. In some embodiments, the second frame is an uplink (UL) frame (e.g., a UL OFDMA frame). In some embodiments, the second frame does not include an indication of whether the another wireless device reduced the BW.

At operation 658, the wireless device determines whether the BW is reduced. In some embodiments, the wireless device determines whether the BW is reduced in accordance with the signaling in the first frame. For example, if the first frame indicates that the BW can only be reduced in 40 MHz segments, the wireless device determines whether BW is reduced in 40 MHz segments. In some embodiments, the wireless device processes each segment to determine if signaling (e.g., a header, a field, an identifier, pre-determined signaling) is identified. In some embodiments, if the wireless device determines that signaling is not identified in at least one segment, the wireless device determines that the BW is reduced.

In response to determining that the BW is reduced, at operation 660, the wireless device processes the second frame to determine the location of the reduced BW. At operation 662, the wireless device processes the second frame to decode the data. In response to determining that the BW is not reduced, at operation 660, the wireless device bypasses operation 660 and proceeds at operation 662.

Accordingly, the systems and methods discussed herein provide for signaling and decoding of punctured subbands in a trigger-based PPDU. In one aspect, at least one of the communication interface or the processing circuitry of a wireless communication device (e.g., an AP) is configured to generate trigger frame that indicates signaling that at least one other wireless communication device is allowed to reduce bandwidth in an allocated resource unit (RU) for transmitting data via a communication channel, transmit, via the communication channel, the trigger frame to at least one other wireless communication device, receive, via the communication channel and from the at least one other wireless communication device, an uplink (UL) OFDMA frame including the data, and process the UL OFDMA frame including the data based on the signaling.

In another aspect, at least one of the communication interface or the processing circuitry of a wireless communication (e.g., a STA) device is configured to generate an uplink (UL) OFDMA frame indicating whether the wireless communication device is reducing its BW in an allocated resource unit (RU) for transmitting data via a communication channel and a location of the reduced bandwidth within the allocated RU, and transmit, to a second wireless communication device, the UL OFDMA frame to be processed to determine whether the wireless communication device is reducing its BW and the location of the reduced bandwidth within the allocated RU. In some embodiments, at least one of the communication interface or the processing circuitry configured to receiving a trigger frame from the second wireless communication device. In some embodiments, the trigger frame indicates signaling that the wireless communication device is allowed to reduce bandwidth in the allocated RU for transmitting data via a communication channel.

B. Computing and Network Environment

Figure 7A:
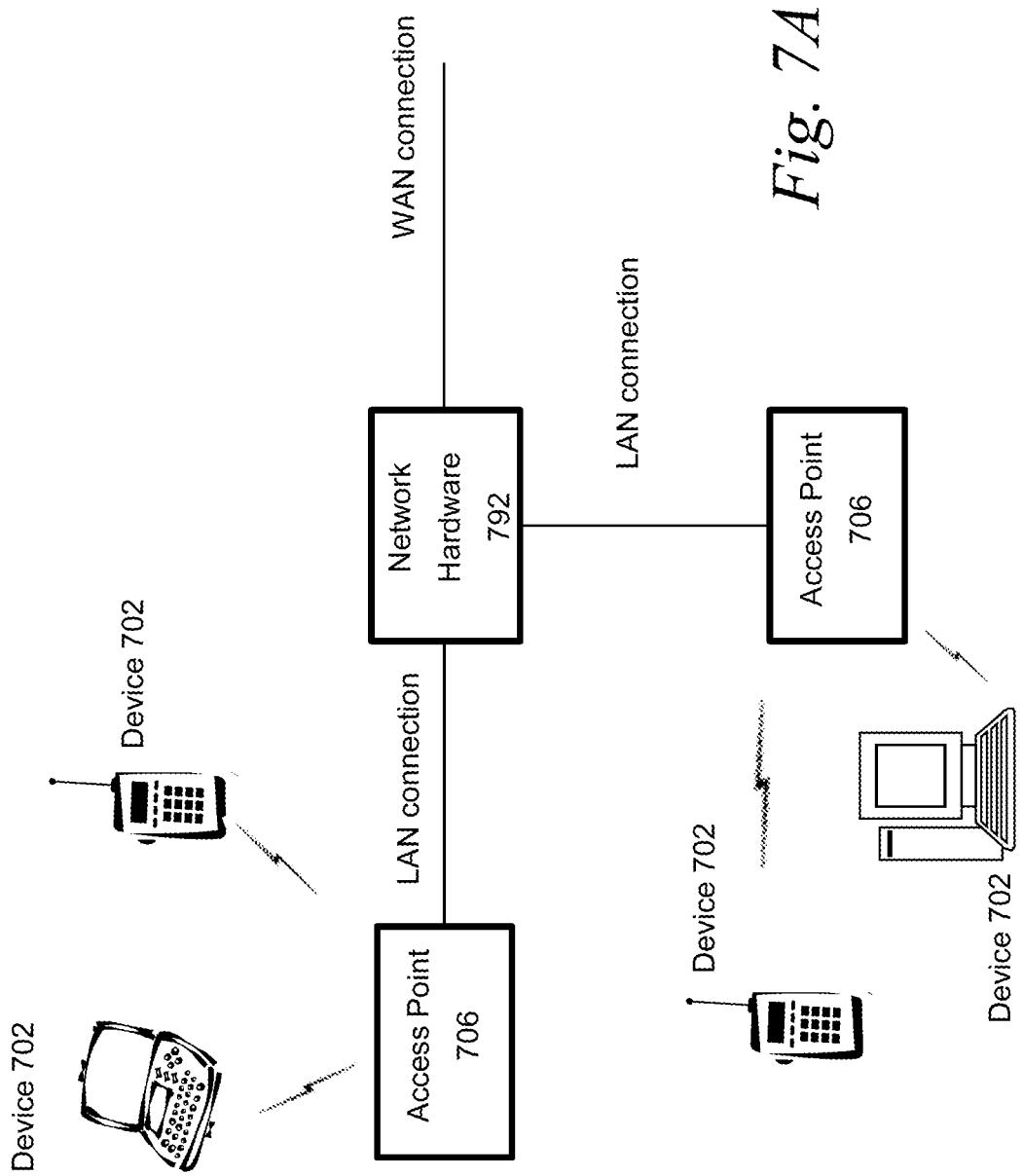
FIG. 7A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 7A, an embodiment of a network environment is depicted. In brief overview, the network environment includes a wireless communication system that includes one or more access points 706, one or more wireless communication devices 702 and a network hardware component 792. The wireless communication devices 702 may for example include laptop computers 702, tablets 702, personal computers 702 and/or cellular telephone devices 702. The details of an embodiment of each wireless communication device and/or access point are described in greater detail with reference to FIGS. 7B and 7C. The network environment can be an ad hoc network environment, an infrastructure wireless network environment, a subnet environment, etc. in one embodiment.

The access points (APs) 706 may be operably coupled to the network hardware 792 via local area network connections. The network hardware 792, which may include a router, gateway, switch, bridge, modem, system controller, appliance, etc., may provide a local area network connection for the communication system. Each of the access points 706 may have an associated antenna or an antenna array to communicate with the wireless communication devices 702 in its area. The wireless communication devices 702 may register with a particular access point 706 to receive services from the communication system (e.g., via a SU-MIMO or MU-MIMO configuration). For direct connections (e.g., point-to-point communications), some wireless communication devices 702 may communicate directly via an allocated channel and communications protocol. Some of the wireless communication devices 702 may be mobile or relatively static with respect to the access point 706.

In some embodiments an access point 706 includes a device or module (including a combination of hardware and software) that allows wireless communication devices 702 to connect to a wired network using Wi-Fi, or other standards. An access point 706 may sometimes be referred to as an wireless access point (WAP). An access point 706 may be configured, designed and/or built for operating in a wireless local area network (WLAN). An access point 706 may connect to a router (e.g., via a wired network) as a standalone device in some embodiments. In other embodiments, an access point can be a component of a router. An access point 706 can provide multiple devices 702 access to a network. An access point 706 may, for example, connect to a wired Ethernet connection and provide wireless connections using radio frequency links for other devices 702 to utilize that wired connection. An access point 706 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 706 may be used for (e.g., in-home or in-building) wireless networks (e.g., IEEE 802.11, Bluetooth, ZigBee, any other type of radio frequency based network protocol and/or variations thereof). Each of the wireless communication devices 702 may include a built-in radio and/or is coupled to a radio. Such wireless communication devices 702 and/or access points 706 may operate in accordance with the various aspects of the disclosure as presented herein to enhance performance, reduce costs and/or size, and/or enhance broadband applications. Each wireless communication devices 702 may have the capacity to function as a client node seeking access to resources (e.g., data, and connection to networked nodes such as servers) via one or more access points 706.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 7B:
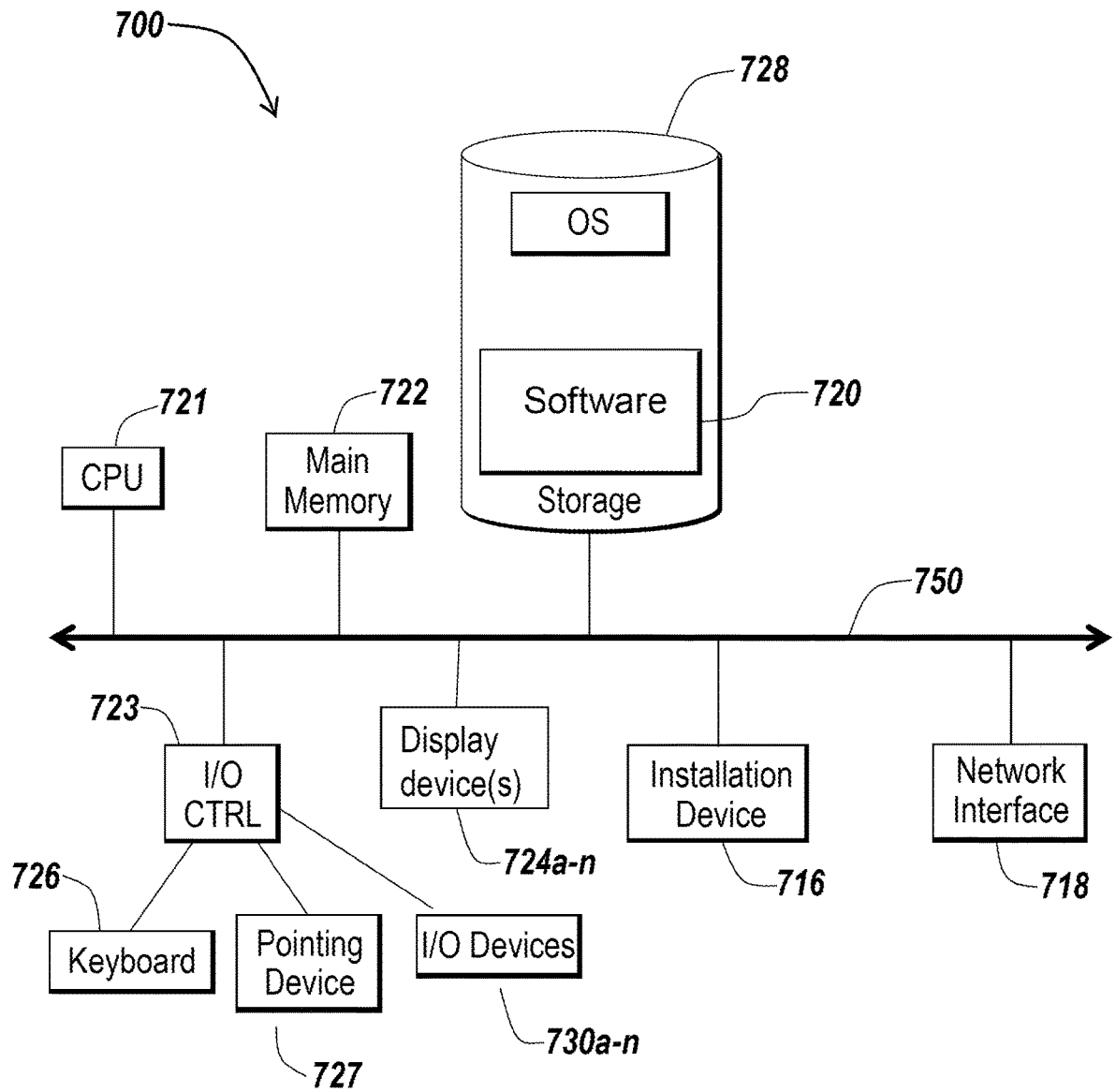
FIGS. 7B and 7C are block diagrams depicting embodiments of computing devices useful in connection with the methods and systems described herein.
Figure 7C:
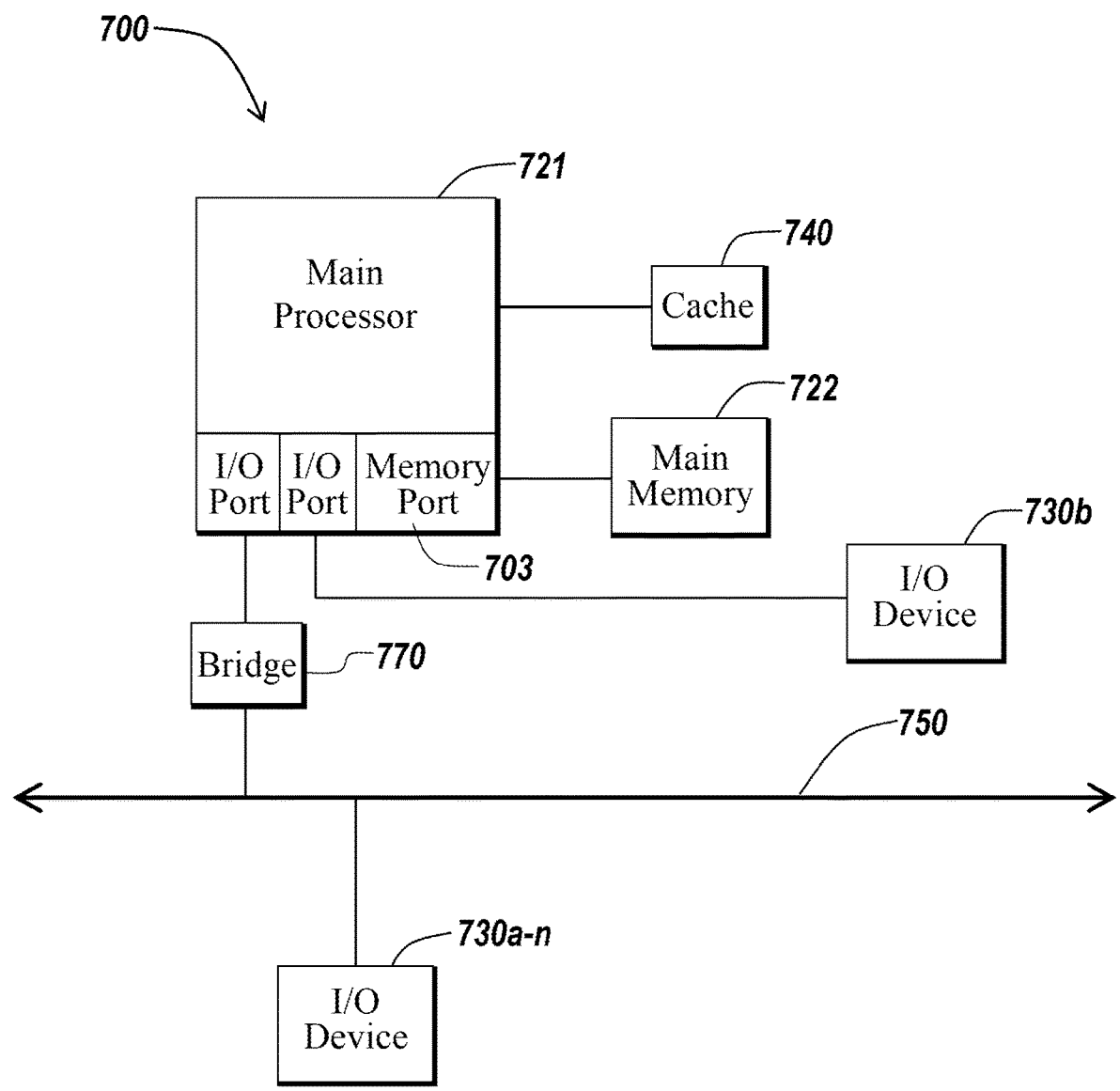

The communications device(s) 702 and access point(s) 706 may be deployed as and/or executed on any type and form of computing device, such as a computer, network device or appliance capable of communicating on any type and form of network and performing the operations described herein. FIGS. 7B and 7C depict block diagrams of a computing device 700 useful for practicing an embodiment of the wireless communication devices 702 or the access point 706. As shown in FIGS. 7B and 7C, each computing device 700 includes a central processing unit 721, and a main memory unit 722. As shown in FIG. 7B, a computing device 700 may include a storage device 728, an installation device 716, a network interface 718, an I/O controller 723, display devices 724a-724n, a keyboard 726 and a pointing device 727, such as a mouse. The storage device 728 may include, without limitation, an operating system and/or software. As shown in FIG. 7C, each computing device 700 may also include additional optional elements, such as a memory port 703, a bridge 770, one or more input/output devices 730a-730n (generally referred to using reference numeral 730), and a cache memory 740 in communication with the central processing unit 721.

The central processing unit 721 is any logic circuitry that responds to and processes instructions fetched from the main memory unit 722. In many embodiments, the central processing unit 721 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 700 may be based on any of these processors, or any other processor capable of operating as described herein.

Main memory unit 722 may be one or more memory chips capable of storing data and allowing any storage location to be directly accessed by the microprocessor 721, such as any type or variant of Static random access memory (SRAM), Dynamic random access memory (DRAM), Ferroelectric RAM (FRAM), NAND Flash, NOR Flash and Solid State Drives (SSD). The main memory 722 may be based on any of the above described memory chips, or any other available memory chips capable of operating as described herein. In the embodiment shown in FIG. 7B, the processor 721 communicates with main memory 722 via a system bus 750 (described in more detail below). FIG. 7C depicts an embodiment of a computing device 700 in which the processor communicates directly with main memory 722 via a memory port 703. For example, in FIG. 7C the main memory 722 may be DRDRAM.

FIG. 7C depicts an embodiment in which the main processor 721 communicates directly with cache memory 740 via a secondary bus, sometimes referred to as a backside bus. In other embodiments, the main processor 721 communicates with cache memory 740 using the system bus 750. Cache memory 740 typically has a faster response time than main memory 722 and is provided by, for example, SRAM, BSRAM, or EDRAM. In the embodiment shown in FIG. 7C, the processor 721 communicates with various I/O devices 730 via a local system bus 750. Various buses may be used to connect the central processing unit 721 to any of the I/O devices 730, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 724, the processor 721 may use an Advanced Graphics Port (AGP) to communicate with the display 724. FIG. 7C depicts an embodiment of a computer 700 in which the main processor 721 may communicate directly with I/O device 730b, for example via HYPERTRANSPORT, RAPIDIO, or INFINIBAND communications technology. FIG. 7C also depicts an embodiment in which local busses and direct communication are mixed: the processor 721 communicates with I/O device 730a using a local interconnect bus while communicating with I/O device 730b directly.

A wide variety of I/O devices 730a-730n may be present in the computing device 700. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 723 as shown in FIG. 7B. The I/O controller may control one or more I/O devices such as a keyboard 726 and a pointing device 727, e.g., a mouse or optical pen. Furthermore, an I/O device may also provide storage and/or an installation medium 716 for the computing device 700. In still other embodiments, the computing device 700 may provide USB connections (not shown) to receive handheld USB storage devices such as the USB Flash Drive line of devices manufactured by Twintech Industry, Inc. of Los Alamitos, California.

Referring again to FIG. 7B, the computing device 700 may support any suitable installation device 716, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 700 may further include a storage device, such as one or more hard disk drives or redundant arrays of independent disks, for storing an operating system and other related software, and for storing application software programs such as any program or software 720 for implementing (e.g., configured and/or designed for) the systems and methods described herein. Optionally, any of the installation devices 716 could also be used as the storage device. Additionally, the operating system and the software can be run from a bootable medium.

Furthermore, the computing device 700 may include a network interface 718 to interface to the network 704 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 700 communicates with other computing devices 700' via any type and/or form of gateway or tunneling protocol such as Secure Socket Layer (SSL) or Transport Layer Security (TLS). The network interface 718 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

In some embodiments, the computing device 700 may include or be connected to one or more display devices 724a-724n. As such, any of the I/O devices 730a-730n and/or the I/O controller 723 may include any type and/or form of suitable hardware, software, or combination of hardware and software to support, enable or provide for the connection and use of the display device(s) 724a-724n by the computing device 700. For example, the computing device 700 may include any type and/or form of video adapter, video card, driver, and/or library to interface, communicate, connect or otherwise use the display device(s) 724a-724n. In one embodiment, a video adapter may include multiple connectors to interface to the display device(s) 724a-724n. In other embodiments, the computing device 700 may include multiple video adapters, with each video adapter connected to the display device(s) 724a-724n. In some embodiments, any portion of the operating system of the computing device 700 may be configured for using multiple displays 724a-724n. One ordinarily skilled in the art will recognize and appreciate the various ways and embodiments that a computing device 700 may be configured to have one or more display devices 724a-724n.

In further embodiments, an I/O device 730 may be a bridge between the system bus 750 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 700 of the sort depicted in FIGS. 7B and 7C may operate under the control of an operating system, which control scheduling of tasks and access to system resources. The computing device 700 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 700 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 700 has sufficient processor power and memory capacity to perform the operations described herein.

In some embodiments, the computing device 700 may have different processors, operating systems, and input devices consistent with the device. For example, in one embodiment, the computing device 700 is a smart phone, mobile device, tablet or personal digital assistant. In still other embodiments, the computing device 700 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A device comprising:
   a communication interface; and
   processing circuitry that is coupled to the communication interface, wherein at least one of the communication interface or the processing circuitry is configured to:
   generate a trigger frame comprising a field having a value indicating a resolution with which at least one other device is allowed to reduce a bandwidth of an allocated resource unit (RU) for transmitting data via a communication channel; and
   transmit, via the communication channel, the trigger frame to the at least one other device;
   receive, via the communication channel and from the at least one other device, an uplink (UL) orthogonal frequency division multiple access (OFDMA) frame including the data and a second value by which the bandwidth is reduced, the OFDMA frame transmitted in a second bandwidth of the RU less than or equal to a first bandwidth according to the value; and
   process the UL OFDMA frame including the data.

2. The device of claim 1, wherein the at least one other device reduces the bandwidth according to the value in the field responsive to determining that an amount of the bandwidth of the allocated RU includes interference greater than a predetermined threshold.

3. The device of claim 1, wherein the trigger frame indicates one or more sub-band locations in which the bandwidth is allowed to be reduced.

4. The device of claim 1, wherein the trigger frame comprises a third value that indicates a target received signal strength indicator (RSSI) based on the resolution.

5. The device of claim 1, wherein the device is an access point (AP) and the at least one other communication device is a station (STA).

6. A device comprising:
   a communication interface; and
   processing circuitry that is coupled to the communication interface, wherein at least one of the communication interface or the processing circuitry is configured to:
   generate a trigger frame comprising a field having a single bit value indicating a resolution with which at least one other device is allowed to reduce a bandwidth of an allocated resource unit (RU) for transmitting data via a communication channel; and
   transmit, via the communication channel, the trigger frame to the at least one other device,
   wherein the at least one other device is configured to transmit a second frame according to the value in the field indicating the resolution with which the at least one other device is allowed to reduce the bandwidth.

7. A device, comprising:
   a communication interface; and
   processing circuitry that is coupled to the communication interface, wherein at least one of the communication interface or the processing circuitry is configured to:
   generate, in response to a trigger frame from a second device allocating a resource unit (RU) having a first bandwidth, an uplink (UL) orthogonal frequency division multiple access (OFDMA) frame including data, the trigger frame comprising a field having a value indicating a resolution with which at least one other device is allowed to reduce a bandwidth of the allocated RU for transmitting the data via a communication channel; and
   transmit, based on the value indicating the resolution with which at least one other device is allowed to reduce the bandwidth of the allocated RU for transmitting the data via the communication channel, the UL OFDMA frame in a second bandwidth of the RU, wherein the second bandwidth is less than the first bandwidth by the value.

8. The device of claim 7, wherein the at least one of the communication interface or the processing circuitry is further configured to:
   determine whether a third bandwidth of the allocated RU includes interference greater than a predetermined threshold.

9. The device of claim 8, wherein at least one of the communication interface or the processing circuitry is further configured to transmit the UL OFDMA frame in the second bandwidth based on determining that an amount of the first bandwidth of the allocated RU includes the interference greater than the predetermined threshold.

10. The device of claim 7, wherein the UL OFDMA frame indicates a different packet extension identifier than a packet extension identifier indicated in the trigger frame.

11. The device of claim 7, wherein the UL OFDMA frame indicates a different pre-forward error correcting (FEC) padding factor than an FEC padding factor indicated in the trigger frame.

12. The device of claim 7, wherein the device is a station (STA) and the second device is an access point (AP).

13. The device of claim 7, wherein the UL OFDMA frame or another UL OFDMA frame is transmitted with one or more of (a) a different modulation and coding scheme (MCS) than an MCS indicated in the trigger frame, or (b) a different number of spatial streams (NSS) than an NSS indicated in the trigger frame.

14. A circuitry comprising:
a communication interface; and
a processor that is coupled to the communication interface, wherein at least one of the communication interface or the processing circuitry is configured to:
generate a trigger frame comprising a field having a value indicating a resolution with which at least one other device is allowed to reduce a bandwidth of an allocated resource unit (RU) for transmitting data via a communication channel; and
transmit, via the communication channel, the trigger frame to the at least one other device;
receive, via the communication channel and from the at least one other device, an uplink (UL) orthogonal frequency division multiple access (OFDMA) frame including the data and a second value by which the bandwidth is reduced, the OFDMA frame transmitted in a second bandwidth of the RU less than or equal to a first bandwidth according to the value; and
process the UL OFDMA frame including the data.

15. The circuitry of claim 14, wherein the trigger frame indicates one or more sub-band locations in which the bandwidth is allowed to be reduced.

* * * * *